(No Model.)

T. R. TIMBY.

APPARATUS FOR TREATING ORES AND FOR OTHER PURPOSES.

No. 296,251. Patented Apr. 1, 1884.

3 Sheets—Sheet 1.

ATTEST.
J. Henry Kaiser.
Geo. T. Smallwood.

INVENTOR.
Theodore R. Timby.
By Knight Bros.
attys (No Model.) 3 Sheets—Sheet 2.

T. R. TIMBY.
APPARATUS FOR TREATING ORES AND FOR OTHER PURPOSES.

No. 296,251. Patented Apr. 1, 1884.

ATTEST.
J. Henry Kaiser.
Geo. T. Smallwood.

INVENTOR.
Theodore R. Timby.
By Knight Bros.
Attys.

(No Model.) 3 Sheets—Sheet 3.

T. R. TIMBY.
APPARATUS FOR TREATING ORES AND FOR OTHER PURPOSES.

No. 296,251. Patented Apr. 1, 1884.

ATTEST.
J. Henry Kaiser.
Geo. T. Smallwood.

INVENTOR.
Theodore R. Timby.
By Knight Bros.
attys.

UNITED STATES PATENT OFFICE.

THEODORE RUGGLES TIMBY, OF NYACK, NEW YORK.

APPARATUS FOR TREATING ORES AND FOR OTHER PURPOSES.

SPECIFICATION forming part of Letters Patent No. 296,251, dated April 1, 1884.

Application filed December 12, 1883. (No model.)

*To all whom it may concern:*

Be it known that I, THEODORE RUGGLES TIMBY, a citizen of the United States, residing at Nyack, in the county of Rockland and State of New York, have invented an Apparatus for Treating Ores and for other Purposes, of which the following is a specification.

My invention relates to an apparatus for treating ores for the removal of sulphur, arsenic, and other substances, and also applicable to other useful purposes.

The object of my invention is a jacketed cylinder mounted upon longitudinal and transverse trunnions with movable bearings, so that it may be rotated on transverse pivots for charging and discharging and on its axis for agitating the contents. It is provided with pipes to admit and discharge steam, superheated or otherwise, to the jacket surrounding the cylinder, and with one or more pipes and manholes communicating with the interior chamber, for the introduction and removal of materials to be treated, and for the discharge of aqueous and other vapors which are thrown off by the heat, assisted, when required, by exhaust through the discharge pipe or pipes, so as to create more or less of a vacuum.

Figure 1:
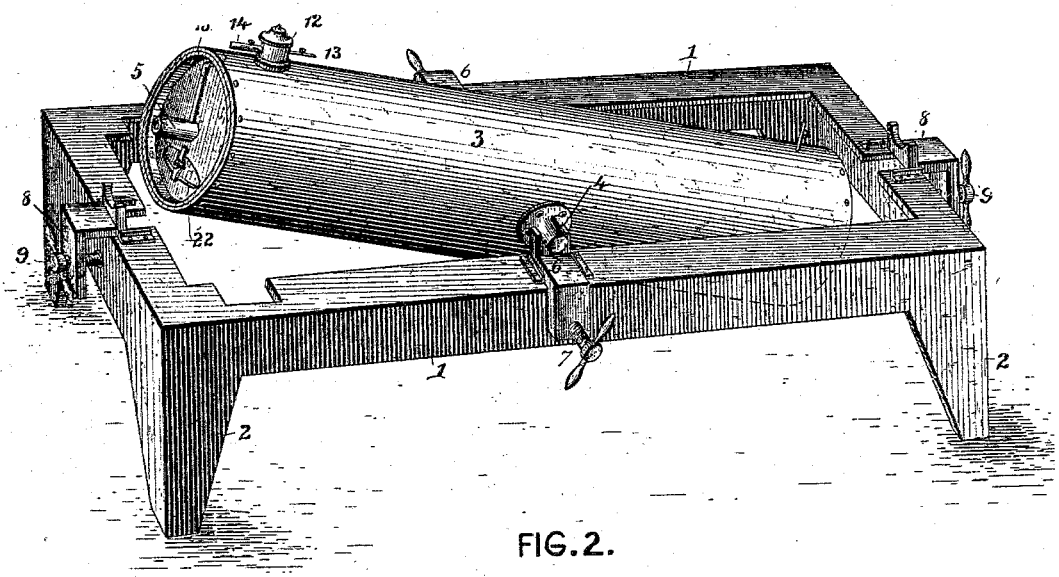
Figure 2:
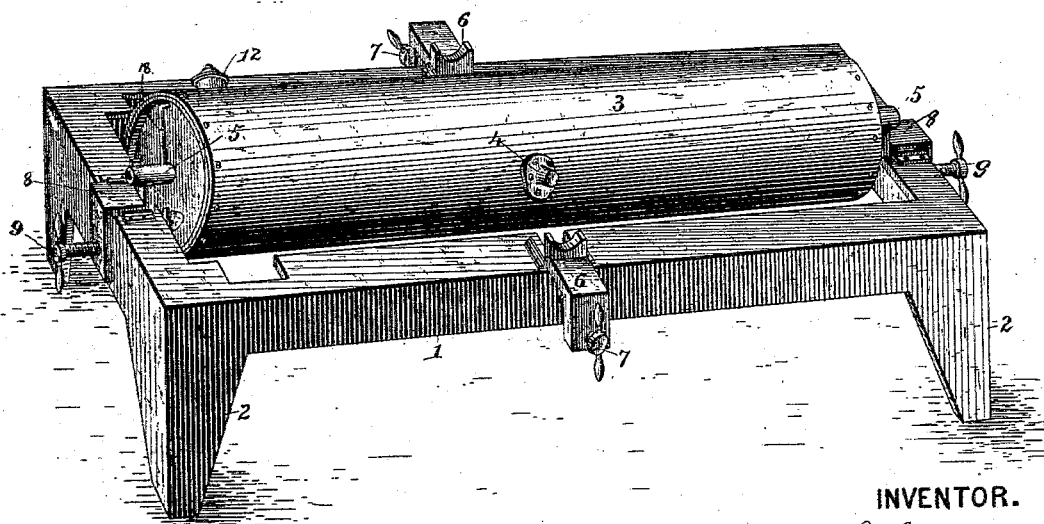
Figure 3:
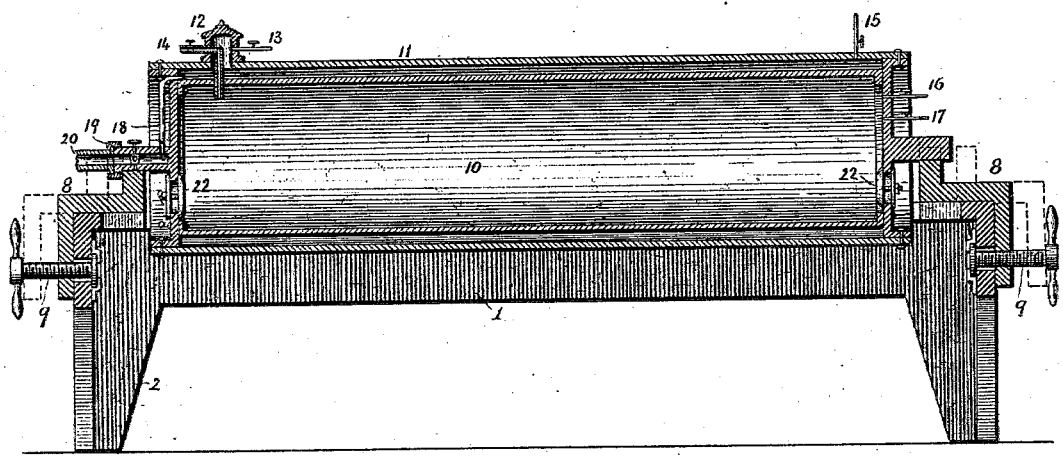
Figure 4:
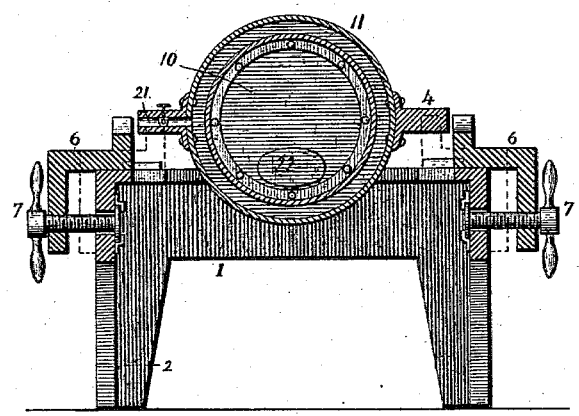
Figure 5:
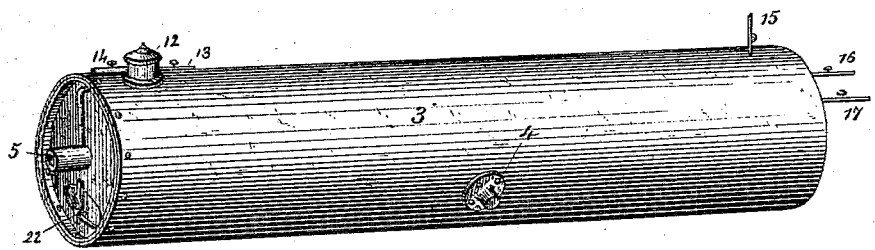
Figure 6:
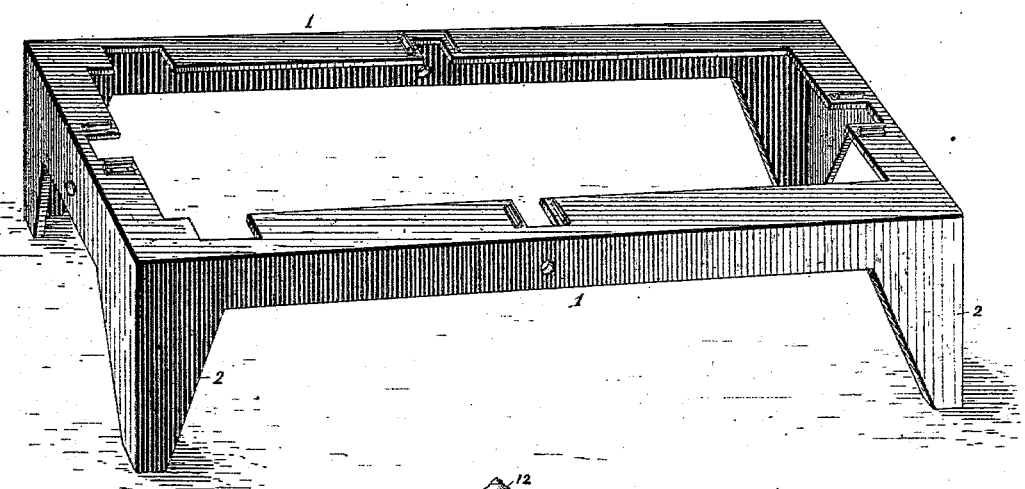
Figure 7:
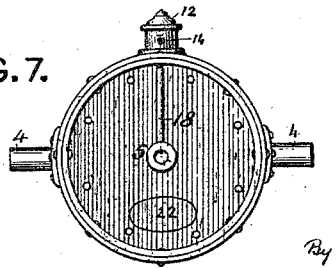

In the accompanying drawings, Figure 1 is a perspective view of the apparatus arranged for tipping on its transverse or radial trunnions. Fig. 2 is a perspective view of the same arranged for rotation on its axial trunnions. Fig. 3 is a longitudinal section, showing in full lines the bearings in position for rotating the cylinder on its axis, and in dotted lines the bearings of the longitudinal trunnions withdrawn, as when the cylinder is to be tipped on its radial trunnions. Fig. 4 is a transverse section, showing in full lines the bearings of the radial trunnions withdrawn to adapt the apparatus for rotating on its axis, and in dotted lines the said bearings advanced to adapt the cylinder for tipping on its radial trunnions. Fig. 5 is a perspective view of the cylinder detached. Fig. 6 is a perspective view of the supporting-frame. Fig. 7 is an end view of the cylinder.

The frame 1 rests upon legs 2, and is made of the proper shape and dimensions to receive the jacketed cylinder 3 within it, and permit it to turn freely either on its radial trunnions 4 or its axial trunnions 5. The radial trunnions 4 are supported by sliding bearing 6, which, when the cylinder is to be rotated on its axis, are withdrawn by screws 7 or other adequate means, as shown in full lines in Fig. 4. The axial trunnions 5 are supported by similar sliding bearings, 8, which are retracted by screws 9 or other adequate means, as illustrated in dotted lines in Fig. 3, when the cylinder is to be tipped on its radial or transverse trunnions 4. The internal chamber of the cylinder for the reception of matters to be treated is shown at 10, and the surrounding steam-jacket at 11. A dome, 12, communicating with the jacket 11, receives a pipe, 13, for the admission of superheated or other steam, and likewise permits the passage of a pipe, 14, for the discharge of aqueous and other vapors from the matters under treatment.

A discharge steam-pipe from the jacket-space 11 is seen at 15. These pipes are guarded by cocks or valves, as represented. Additional pipes are shown at 16 17, which may be used for the admission and discharge of steam, or for the admission and removal of any fluid from the inner space of the cylinder.

In order to provide for the circulation of the superheated steam in the jacket-space 11 while the apparatus is in operation, I may employ any ordinary means for keeping up a constant communication with fixed pipes leading from the steam-generator. As an illustration, I have shown a pipe, 18, communicating with an opening through one of the axial trunnions, which is removably connected by a coupling, 19, with an outer pipe, 20, and may thus be removed at will from the trunnion when the apparatus is to be tipped for filling or discharging. The outer pipe, 20, may communicate by a flexible pipe with the steam-boiler or other supply, and the trunnion turn on it, or it may be rotated together with the trunnion, and pass through a stuffing-box of ordinary construction to communicate with the fixed supply-pipe. At 21 I have shown an opening passing through one of the radial trunnions and communicating with the steam-jacket 11. This hollow trunnion has in practice a similar coupling and outer pipe, which may be passed through a stuffing-box connecting it with the fixed supply-pipe, as already described.

At 22 are shown man-holes for the introduction and removal of matters to be treated. By turning the cylinder on its radial trunnions 4, either the man-holes may be brought to the top for charging the cylinder or to the bottom for discharging it. The radial trunnions may also be used in some cases for agitating the materials under treatment. The axial trunnions 5 are specially intended for permitting the rotation of the cylinder for the purpose of agitating the contents. This rotation may be effected by any simple mechanical device, such as a lever or cog-gearing, or by other means. The discharge-pipe 14, for example, may communicate with any customary and adequate means for exhausting the air and vapor, so as to treat the material *in vacuo*.

By the aid of a nearly-complete vacuum and alternate heating and cooling of the ores, various deleterious matters may be effectually discharged therefrom.

Having thus described my invention, the following is what I claim as new therein and desire to secure by Letters Patent:

1. A jacketed cylinder mounted on radial and longitudinal trunnions with movable bearings, to permit the optional use of either pair of trunnions for the rotation of the cylinder in either direction, substantially as and for the purposes set forth.

2. A cylinder mounted on trunnions supported by sliding bearings which may be withdrawn to permit the rotation of the cylinder, substantially as described.

3. The combination of the cylinder 3, having radial trunnions 4 and axial trunnions 5, the supporting-frame 1, and the retractible bearings 6 and 8, substantially as and for the purposes set forth.

THEODORE RUGGLES TIMBY.

Witnesses:
OCTAVIUS KNIGHT,
HARRY E. KNIGHT.